(12) United States Patent  (10) Patent No.: US 8,868,686 B1
Anpat et al.  (45) Date of Patent: Oct. 21, 2014

(54) SHARING OF REPOSITORY DATA FOR NON-ALIAS IDENTITIES

(75) Inventors: Sourabh Anpat, London (GB); Ricky Kaura, Uxbridge (GB); Matteo Candaten, Hemel Hempstead (GB)

(73) Assignee: Microsoft Corporation, Redmond, WA (US)

( * ) Notice: Subject to any disclaimer, the term of this patent is extended or adjusted under 35 U.S.C. 154(b) by 53 days.

(21) Appl. No.: 12/415,341

(22) Filed: Mar. 31, 2009

(51) Int. Cl.
 *G06F 15/16* (2006.01)

(52) U.S. Cl.
 USPC .......................................................... 709/219

(58) Field of Classification Search
 USPC .......................................................... 709/219
 See application file for complete search history.

(56) References Cited

U.S. PATENT DOCUMENTS

| | | | | |
|---|---|---|---|---|
| 6,006,232 | A * | 12/1999 | Lyons ................... | 707/999.001 |
| 2006/0136557 | A1* | 6/2006 | Schaedler et al. ............ | 709/203 |
| 2008/0212569 | A1* | 9/2008 | Terrill et al. .................. | 370/352 |
| 2008/0243879 | A1* | 10/2008 | Gokhale et al. ............... | 707/100 |
| 2009/0098853 | A1* | 4/2009 | Mutikainen et al. .......... | 455/406 |

FOREIGN PATENT DOCUMENTS

| | | |
|---|---|---|
| CA | 2751082 | 10/2010 |
| CN | 102379116 | 3/2012 |
| JP | 2008131086 | 6/2008 |
| JP | 2009502071 | 1/2009 |
| JP | 2012522301 | 9/2012 |
| KR | 20120003873 | 1/2012 |
| WO | WO-2010112918 | 10/2010 |

OTHER PUBLICATIONS

Anpat, Sourabh. "DRAFT: LS on support of grouping identities in the Sh interface." 3GPP TSG-CT WG4 Meeting #32. Da Lian, China. Aug. 28, 2006-Sep. 1, 2006. pp. 1-2.*
Meeting Information: 3GPPCT4#32. Accessed on May 16, 2011: <http://webapp.etsi.org/MeetingCalendar/MeetingDetails.asp?mid=25109>. 1 page.*
3GPP Meeting Registration: 3GPPCT4:32. Accessed on May 16, 2011: <http://webapp.etsi.org/3GPPRegistration/fViewPartasp?mid=25109>. pp. 1-3.*
"3rd Generation Partnership Project; Technical Specification Group Core Network and Terminals; IP Multimedia (IM) Subsystem Sh interface; Signalling flows and message contents (Release 7)." 3rd Generation Partnership Project. Sep. 2006. pp. 1-41.*
"3rd Generation Partnership Project; Technical Specification Group Core Network and Terminals; Sh Interface based on the Diameter protocol", *3GPP Standard; 3GPP TS 29.329, 3rd Generation Partnership Project (3GPP), Mobile Competence Centre ; 650, Route Des Lucioles*, (Mar. 1, 2009), pp. 1-19.

(Continued)

*Primary Examiner* — Christopher Biagini
(74) *Attorney, Agent, or Firm* — Alin Corie; Mike Allen; Micky Minhas

(57) ABSTRACT

A method for storing data in an IP multimedia subsystem (IMS) is disclosed. The method comprises:
i) selecting a first user and a second user, which are not aliases;
ii) analyzing first and second data sets associated with the first and second users respectively to identify common data elements in each of the first and second data sets, the first and second data sets being useable by a first application server within the IMS to satisfy service requests on behalf of the first and second users;
iii) creating a data structure containing a single instance of the identified common data elements; and
iv) storing the data structure in a home subscriber server (HSS) within the IMS.

20 Claims, 3 Drawing Sheets

(56) References Cited

OTHER PUBLICATIONS

"International Search Report", Application No. PCT/GB2010/050546, (Aug. 18, 2010), 3 pages.
"Written Opinion", Application No. PCT/GB2010/050546, (Sep. 30, 2011), 7 pages.
Arauz, J et al., "Registration Event Package Extension for IP Multimedia Subsystem (IMS) Grouping of Addresses of Record (AoR)", <draft-jarauz-sipping-groupingreg-event-01.txt> *IETF Standard-Working-Draft, Internet Engineering Task Force, IETF, CH*, No. 1, (Jun. 20, 2007), 15 pages.
Velarde, Luis et al., "IMS Service Profile Optimization", IP.Com *Journal*, IP.Com Inc., (May 17, 2006), 5 pages.

"Foreign Office Action", Chinese Application No. 201080014505.3, Oct. 25, 2013, 11 Pages.
"Foreign Office Action", Japanese Application No. 2012-502806, Nov. 19, 2013, 3 Pages.
"Decision to Grant", JP Application No. 2012-502806, Jul. 8, 2014, 4 Pages.
"Foreign Office Action", RU Application No. 2011141194, Aug. 1, 2014, 5 Pages.
"Foreign Office Action", CN Application No. 201080014505.3, Jul. 14, 2014, 7 pages.
"Foreign Office Action", JP Application No. 2012-502806, Mar. 18, 2014, 6 Pages.

* cited by examiner

SHARING OF REPOSITORY DATA FOR NON-ALIAS IDENTITIES

This invention relates to the storage of data, and specifically data associated with users to enable an application server to dispatch service requests to those users, in an IP multimedia subsystem (IMS).

The IMS is a service overlay architecture capable of providing internet protocol (IP) based services on a 3G network, thereby allowing mobile users to access the rich variety of services available on an IP network. IMS can also provide services typically associated with circuit switched networks, such as call forwarding.

The IMS architecture and functionality is defined by a set of standards provided by the $3^{rd}$ Generation Partnership Project (3GPP).

Three key elements of the IMS architecture are a Serving-Call Session Control Function (S-CSCF), a Home Subscriber Server (HSS) and an application server. The S-CSCF handles the routing of signals to and from users via one or more application servers according to service profile information held for each user in the HSS.

The HSS holds service profile information for each user. It acts as a centralised database that contains a variety of data related to the users including the service to which the user has subscribed and may participate in.

The data stored by the HSS may be transparent data, meaning that the HSS understands the syntax but not the semantics of the data, or non-transparent data, meaning that the HSS understands both the syntax and semantics of the data.

The data related to users (i.e. describing their service profile and specific configuration of the service for the users) is transparent data. It is stored in a container (in this case a data structure known as a BLOB, or binary large object) which is sent to the HSS by the application server for storage in the HSS database. Thus, the container effectively represents a database within a database and the HSS does not know the meaning of the data, it merely knows how to access the container and return it to the application server on request when the application server needs to service a request on behalf of a user. The application server provides a Service Indication in accordance with the 3GPP standards, and this Service Indication is used as a key by the HSS to retrieve one of the containers from the database.

The 3GPP standards also define an Alias Repository data element that contains transparent data associated with a group of user identities, each of which is an alias of the others. To be considered as an alias each user identity in a group must satisfy three conditions:
1) they must be part of the same service profile (i.e. all the users subscribe to the same services);
2) they must be part of the same implicit registration set; and
3) they must have the same service configuration for each and every service.

A set of Public User Identities belonging to a user form an implicit registration set when all of the identities in the set is implicitly registered for a service via a single IMS registration of one of the Public User Identities in that set. No single public identity shall be considered as a master to the other Public User Identities. When one of the Public User Identities within the set is registered, all Public user identities associated with the implicit registration set are registered at the same time. This association is maintained by the HSS.

It can be seen as a restriction that each user identity in a group must have the same service configuration for each and every service to be considered an alias. For example, each user would have to have the same call forwarding number for a call forwarding service, which could easily defeat the purpose of the service.

The existence of the Alias Repository data element does prevent the HSS from having to store redundant copies of the same data for each of the aliases. However, redundant transparent data still has to be stored for a group of user identities that are not aliases (i.e. they do not satisfy each of the above three conditions).

In accordance with a first aspect of the present invention, there is provided a method for storing data in an IP multimedia subsystem (IMS), the method comprising:
i) selecting a first user and a second user, which are not aliases;
ii) analysing first and second data sets associated with the first and second users respectively to identify common data elements in each of the first and second data sets, the first and second data sets being useable by a first application server within the IMS to satisfy service requests on behalf of the first and second users;
iii) creating a data structure containing a single instance of the identified common data elements; and
iv) storing the data structure in a home subscriber server (HSS) within the IMS.

Thus, the invention overcomes the problems inherent with the existing IMS by allowing data related to non-alias users to be reduced to a set of data that excludes redundant data elements. This provides a variety of benefits, namely memory optimisation at the HSS by storing data associated with groups of non-alias user identities once only rather than having multiple instances of same data; improving notification efficiency between the HSS and the application server by reducing the need for multiple data-read/profile update operations due to the grouped nature of data; easier management of subscription data at the HSS due to single location and storage of information; and improved flexibility for the application server by allowing service interactions to be designed based on grouping of data not restricted to alias identities.

Typically, the common data elements are stored in the HSS as a transparent data set.

The common data elements are normally stored in a container within a database maintained by the HSS. A suitable container is a BLOB (binary large object).

Typically, the container is returned to the first application server in response to a request for access to the common data elements.

In a preferred embodiment, the first application server subscribes to receive notification of changes to the common data elements.

In a variant of this preferred embodiment, the HSS detects a change to the common data elements and sends a notification message to the first application server.

This notification message preferably contains details of the change made to the common data elements. Alternatively, the application server may explicitly query the HSS to determine the details of the change.

the common data elements are accessible by a second application server implementing the same service as the first application server.

In accordance with a second aspect of the invention, there is provided a system comprising a processor adapted to cause each of the steps of the method of the first aspect to be performed.

In accordance with a third aspect of the invention, there is provided a computer-readable medium comprising instructions executable on a processor to cause the processor to implement the method of the first aspect.

In accordance with a fourth aspect of the invention, there is provided a computer program comprising instructions executable on a processor to cause the processor to implement the method of the first aspect.

An embodiment of the invention will now be described with reference to the accompanying drawings, in which.

Figure 1:
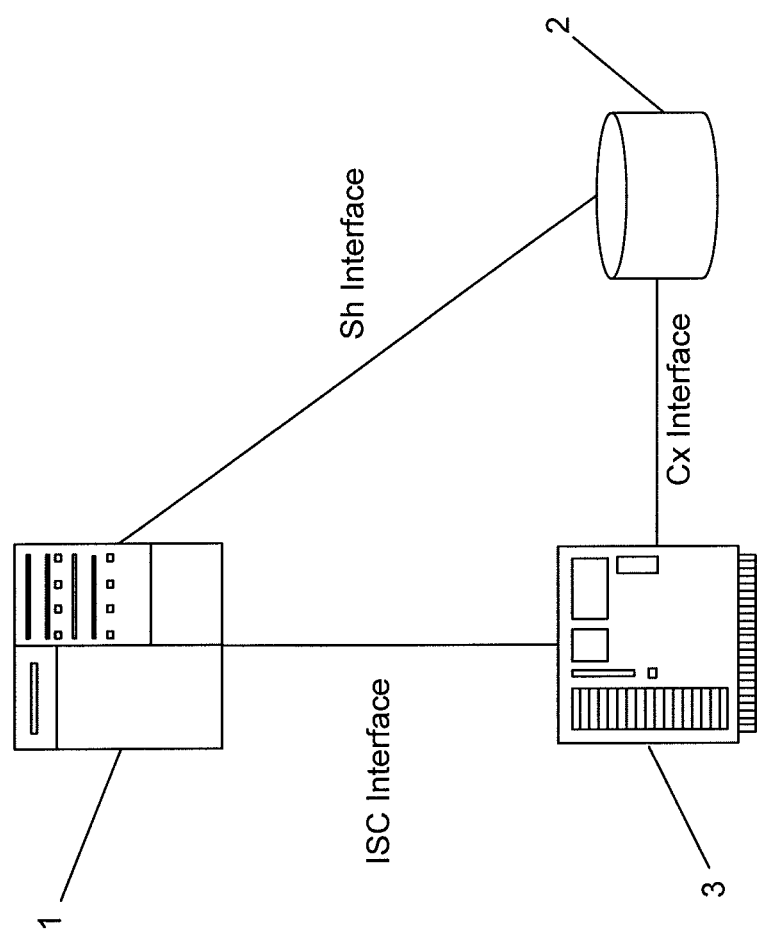
FIG. 1 shows part of an IP Multimedia Subsystem (IMS) on which the invention may be carried out.

FIG. 1 shows an application server 1 coupled to a HSS 2 and a S-CSCF 3. The application server 1 is coupled to the HSS 2 using a Sh interface and to the S-CSCF 3 using an ISC interface. The HSS 2 and S-CSCF 3 are coupled using a Cx interface. The Sh and Cx interfaces are defined as part of the DIAMETER protocol which is a networking protocol for use in authentication, authorisation and accounting. The ISC interface is defined as part of the Session Initiation Protocol (SIP).

As already mentioned, the S-CSCF 3 handles the routing of signals to and from users via the application server 1 according to service profile information held for each user in the HSS 2.

The HSS 2 holds service profile information for each user of the system. It acts as a centralised database that contains a variety of data related to the users including the service to which the user has subscribed and may participate in.

The application server 1 is configured to respond to service requests by perform the steps required to process the service request and return a suitable response and/or take appropriate actions based on the request. The processing and appropriate actions will depend on the service provided by the application server 1. The application server 1 may provide more than one service.

Examples of the types of service that the application server 1 may provide are a call screening service, a call forwarding service or a communication barring service.

The implementation of the Sh interface in the application server 1 can operate in two modes: Data handling and Subscriptions/Notification.

Data handling mode uses Sh Pull for retrieving data from the HSS 2 and Sh Update for storing data into the HSS 2. Data is retrieved from the HSS 2 by creating an Sh Pull request, and data is stored in the HSS 2 by making an Sh Update request.

The Subscriptions/Notifications mode allows the application server 1 to get a notification when particular data for a specific user is updated in the HSS 2 by other network entities.

The list below summarises the type of data that can be requested using an Sh application:

Repository data: contains transparent data related to the service.

Public identifiers: contains a list of Public User Identity (IMPU) associated with the user.

IMS User State: contains the information about IMS User State of the public identifiers; the possible values are REGISTERED, NOT_REGISTERED, AUTHENTICATION_PENDING, REGISTERED_UNREG_SERVICES.

S-CSCF Name: contains the address of the S-CSCF allocated to the user.

Initial Filter Criteria: contains the triggering information for the service; an AS can only get the initial filter criteria related to the service provided.

Location Information: contains the location information related to the user that could be located in Circuit-Switched (CS) or Packet-Switched (PS) domain.

User State: contains the state of the user in the CS/PS domain.

Charging information: contains the address of charging function.

MSISDN: contains the MSISDN (which is a number uniquely identifying a subscription in a GSM or UMTS mobile network) associated with the Public User Identity.

Figure 2:
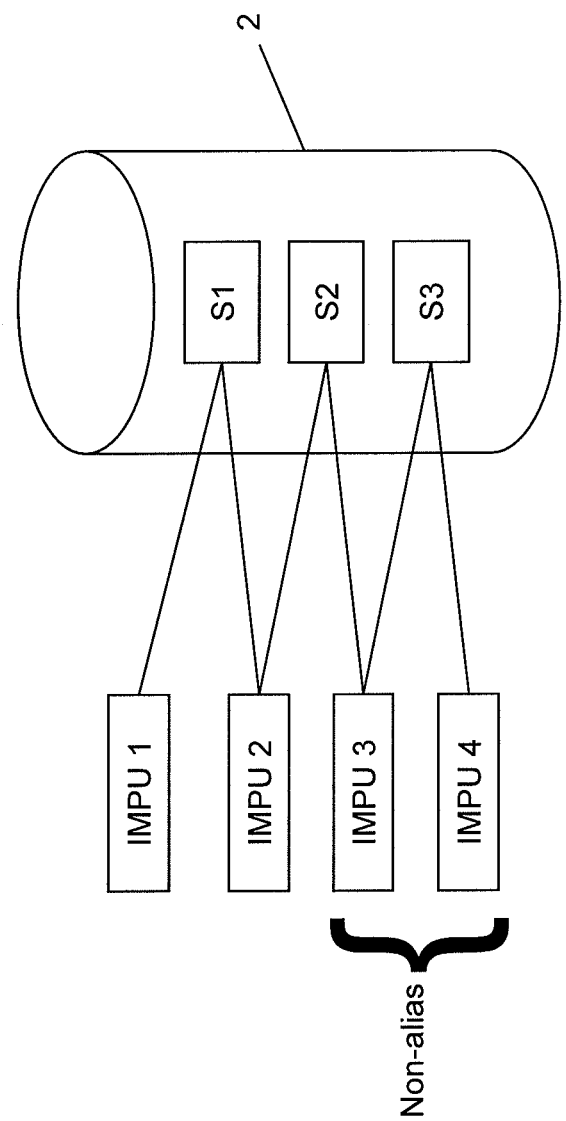
FIG. 2 shows schematically the association of grouped repository data within the HSS with a set of users.

FIG. 2 shows a set of IMS public identities (IMPU) IMPU 1 to IMPU 4, each of which may wish to access the HSS 2 to retrieve repository data related to them. In the situation shown in FIG. 2, IMPU 1, IMPU 2 and IMPU 3 are aliases. IMPU 1 and IMPU 2 are able to access grouped repository data S1 on the HSS2 and IMPU 2 and IMPU 3 are able to access grouped repository data S2 on the HSS 2. As previously mentioned, the IMPUs 1 to 4 use the Service Indication as a key into the grouped repository BLOBs (binary large objects).

IMPU 3 and IMPU 4 are not aliases. However, the application server 1 is able to create group repository data for these two identities using a profile-update operation which will then be shared by IMPU 3 and IMPU 4.

Figure 3:
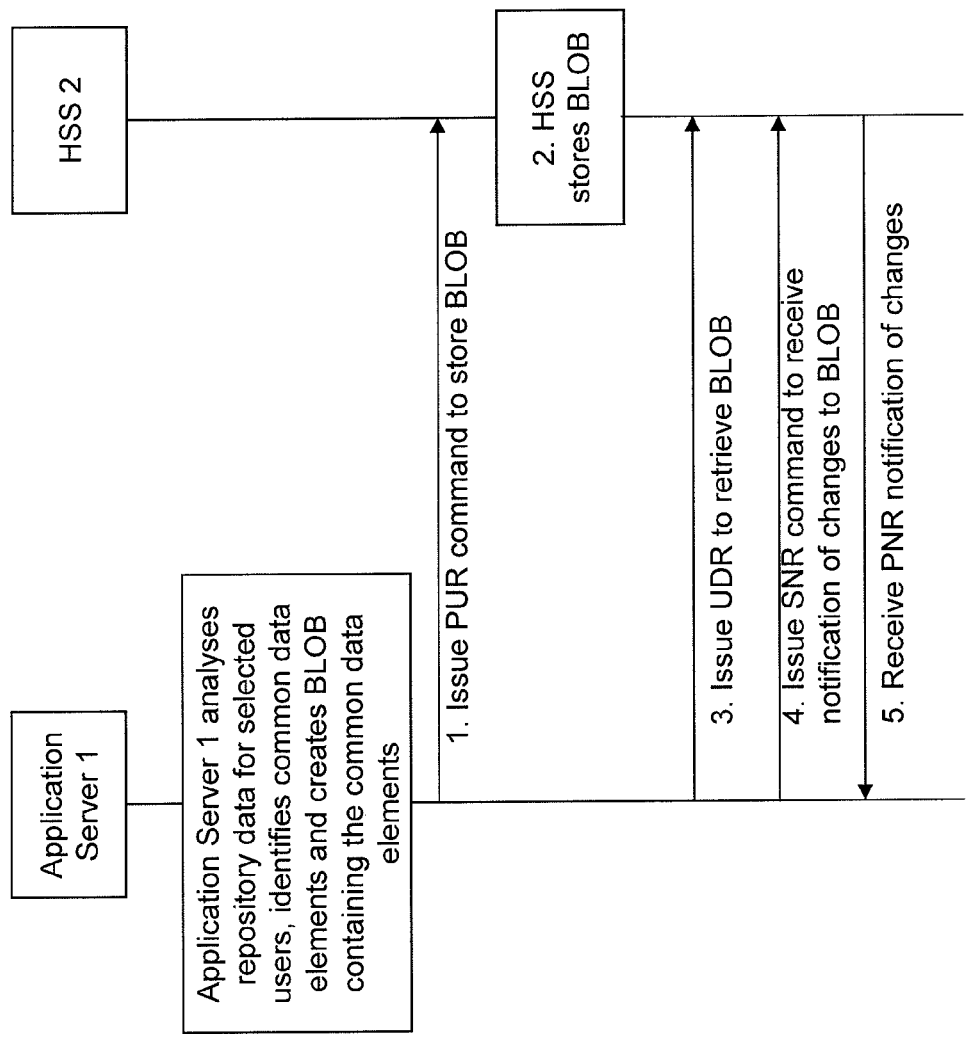
FIG. 3 shows steps performed at the application server and HSS in carrying out the invention.

The way that this is done will be explained by reference to FIG. 3, which shows the interactions between the application server 1 and the HSS 2 in generating and storing grouped repository data for the two non-alias identities IMPU 3 (referred to as User A in FIG. 4) and IMPU 4 (referred to as User B in FIG. 4).

Firstly, the application server 1 selects a pair of users which are not aliases of each other, in this case Users A and B. It then analyses the repository data associated with each user to identify common data elements in each of the repository data sets.

For example, User A may subscribe to call screening and call forwarding services and User B may subscribe to Call Screening, Call Forwarding and Communication Barring services.

Due to the difference in subscribed services (i.e. the different service profiles of Users A and B) User A and User B are not-aliases. However, the repository data related to the Call Forwarding Service for User A and B can nevertheless be grouped together and stored as a single instance of data.

A typical set of repository data that might be kept as configuration data for each of User A and User B includes information elements indicating that the user is authorised to use the service, that the service is activated for that user, a call forwarding destination (a uniform resource identifier (URI) such as a telephone number or e-mail address) and other subscription options. In this case, all these information elements with the exception of the call forwarding destination may be the same for User A and User B. For example, both users A and B may be authorised, the service may be activated for both users and the other subscription options may be identical.

Thus, the application server 1 can analyse the repository data for each of Users A and B to identify the common data elements, i.e. the indications that the user is authorised to use the service, that the service is activated for that user and the other subscription options, for both User A and User B and create a container (such as a BLOB) for storing in the HSS 2.

Then, the application server 1 sends the container with the grouped repository data for Users A and B to HSS 2 and issues a PUR command to cause the HSS 2 to store the grouped repository data in its database. Thus, the grouped repository data stored in the HSS 2 is transparent data grouped across two non-alias users A and B. These actions are shown as steps 1 and 2 in FIG. 3.

Steps 3 to 5 show optional steps which may be performed to interact with the grouped repository data after it has been created and stored.

In step 3, the application server 1 issues a UDR command to HSS 2 to retrieve the grouped repository data for users A and B, which it may need to do to respond to service requests for either user. The UDR command will be accompanied by the Service Indication (i.e. Call Forwarding) and the user identity (i.e. IMPU 3 or 4) which the HSS 2 will use as a key to retrieve the grouped repository data which can then be returned to the application server 1.

In step 4, the application server 1 subscribes to be notified of changes to the grouped repository data for users A and B. It does this by issuing a SNR command to HSS 2. The SNR command will be accompanied by the Service Indication (i.e. Call Forwarding) and the user identity (i.e. IMPU 3 or 4) which the HSS 2 will use to identify the data which the application server 1 needs to be notified of in the event of a change to that data.

In step 5, the HSS 2 has detected a change to the data (as may be made, for example, by another network entity which handles the call forwarding service). The HSS 2 responds to this by issuing a notification message (known as a PNR notification) to application server 1. The application server 1 can then use the UDR command as already described to retrieve and inspect the altered data if necessary or to perform any required processing in response to the change.

The steps performed in analysing the repository data for non-alias users and identifying common data elements and constructing a grouped set of repository data have been described as being performed by the application server 1. It is important to realise that these steps may instead be performed by an alternative network entity, possibly as its only purpose, and still fall within the scope of the invention.

The invention claimed is:

1. A method for storing data in an IP multimedia subsystem (IMS), the method comprising:
    selecting a first user and a second user, wherein the first and second users are associated with different service profiles, and wherein each of the first and second users subscribe to at least one service;
    analyzing a first set of repository data, associated with the first user, and a second set of repository data, associated with the second user, the first and second sets of repository data being useable by a first application server within the IMS to satisfy service requests on behalf of the first and second users, the analyzing first and second sets of repository data comprising:
    analyzing the first and second sets of repository data effective to identify at least one common configuration data element within the first and second sets of repository data, wherein the at least one common configuration data element is associated with at least one service; and
    responsive to identifying the at least one common configuration data element associated with the at least one service, creating a new data structure containing a single instance of each said identified common configuration data element associated with the at least one service; and
    storing the new data structure in a home subscriber server (HSS) within the IMS.

2. A method according to claim 1 further comprising: enabling storage of said identified at least one common configuration data element in the HSS as a transparent data set.

3. A method according to claim 2 further comprising: enabling storage of said identified at least one common configuration data element in a container within a database maintained by the HSS.

4. A method according to claim 3 further comprising: receiving the container in response to a request for access to said identified at least one common configuration data element.

5. A method according to claim 1 further comprising: subscribing to receive notification of changes associated with said identified at least one common configuration data element.

6. A method according to claim 5 further comprising: receiving a notification message associated with one or more changes associated with said identified at least one common configuration data element.

7. A method according to claim 6, wherein the notification message contains details of the one or more changes made to said identified at least one common configuration data element.

8. A method according to claim 1 further comprising: providing, via a first application server, the at least one service associated with said identified at least one common configuration data element, said identified at least one common configuration data element configured as accessible by a second application server additionally implementing the at least one service.

9. An IP multimedia system (IMS) comprising:
    a processor;
    one or more computer-readable hardware storage media; and
    computer-readable instructions stored on the one or more computer-readable hardware storage media, the computer-readable instructions which, responsive to execution by the processor, are configured to:
    select a first user and a second user, which are not aliases, wherein each of the first and second users subscribe to at least one same service;
    analyze a first set of repository data and a second set of repository data associated with the first and second users respectively, the first and second sets of repository data being useable by a first application server within the IMS to satisfy service requests on behalf of the first and second users, wherein the computer-readable instructions to analyze are further configured to:
    analyze the first and second sets of repository data effective to identify at least one common configuration data element within the first and second sets of repository data, wherein the at least one common configuration data element is associated with the at least one same service; and
    responsive to identifying the at least one common configuration data element within the first and second sets of repository data, create a new data structure containing a single instance of the identified at least one common configuration data element, wherein the new data structure is configured to be useable by one or more application servers within the IMS to satisfy service requests; and
    provide the new data structure to a home subscriber server (HSS) within the IMS to be stored.

10. The system of claim 9, wherein the computer-readable instructions are further configured to: enable storage of the identified at least one common configuration data element in the HSS as a transparent data set.

11. The system of claim 10, wherein the computer-readable instructions are configured to: enable storage of the identified at least one common configuration data element in a container within a database maintained by the HSS.

12. The system of claim 9, wherein the computer-readable instructions are further configured to: subscribe to receive notification of changes associated with the identified at least one common configuration data element.

13. The system of claim 9, wherein the computer-readable instructions are further configured to: receive a notification message associated with one or more changes to the identified at least one common configuration data element.

14. The system of claim 13, wherein the computer-readable instructions are further configured to:

responsive to receiving a notification message, analyze the changes associated with the notification message effective to determine additional processing responsive to the changes.

15. The system of claim 9, wherein the identified at least one common configuration data element associated with the at least one service comprises:

an element configured to indicate whether a user is authorized to use the at least one service;

an element configured to indicate whether the at least one service is activated for an associated user; and an element configured to indicate a forwarding destination.

16. The system of claim 9, wherein the identified at least one common configuration data element comprises a subset of the configuration data elements associated with the at least one service.

17. One or more computer-readable hardware storage media comprising computer-readable instructions which, responsive to execution by at least one processor, implement a method comprising:

selecting a first user and a second user, which are not aliases, wherein each of the first and second users subscribe to at least one same service and at least one different service from one another;

analyzing a first set of repository data, associated with the first user, and a second set of repository data, associated with the second user, the first and second repository data sets being useable by a first application server within the IMS to satisfy service requests on behalf of the first and second users, said analyzing comprising:

analyzing the first and second repository data sets effective to identify at least one common configuration data element associated with the at least one same service; and responsive to identifying the at least one common configuration data element associated with the at least one same service creating a new data structure containing a single instance of the identified common configuration data elements associated with the at least one same service, wherein the new data structure is configured to be useable by one or more application servers within the IMS to satisfy service requests from at least two non-aliased users; and providing the new data structure to a home subscriber server (HSS) within the IMS to be stored.

18. The one or more computer-readable hardware storage media of claim 17, the method further comprising enabling storage of the identified common configuration data elements associated with the at least one same service in the HSS as a transparent data set.

19. The one or more computer-readable hardware storage medium of claim 17, the method further comprising subscribing to receive notification of changes associated with the identified common configuration data elements associated with the at least one same service.

20. The one or more computer-readable hardware storage medium of claim 17, the method further comprising receiving notification of changes associated with the identified common configuration data elements associated with the at least one same service.

* * * * *